(12) United States Patent
Duong et al.

(10) Patent No.: US 10,502,231 B2
(45) Date of Patent: Dec. 10, 2019

(54) DIFFUSER PIPE WITH VORTEX GENERATORS

(71) Applicant: PRATT & WHITNEY CANADA CORP., Longueuil (CA)

(72) Inventors: Hien Duong, Mississauga (CA); Vijay Kandasamy, T. Palur (IN); Madhusudhan Keragodu, Bangalore (IN)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 58 days.

(21) Appl. No.: 15/896,664

(22) Filed: Feb. 14, 2018

(65) Prior Publication Data
US 2018/0180059 A1    Jun. 28, 2018

Related U.S. Application Data

(63) Continuation of application No. 14/924,108, filed on Oct. 27, 2015, now Pat. No. 9,926,942.

(51) Int. Cl.
*F04D 29/28* (2006.01)
*F04D 29/44* (2006.01)
*F02C 3/08* (2006.01)

(52) U.S. Cl.
CPC ............ *F04D 29/441* (2013.01); *F02C 3/08* (2013.01); *F05B 2220/302* (2013.01); *F05B 2240/122* (2013.01); *F05B 2240/13* (2013.01); *F05D 2240/127* (2013.01)

(58) Field of Classification Search
CPC .............. F04D 29/284; F04D 29/441; F05B 2220/302; F05B 2240/122; F05B 2240/13
See application file for complete search history.

(56) References Cited

U.S. PATENT DOCUMENTS

| | | | | |
|---|---|---|---|---|
| 571,612 | A * | 11/1896 | Eichhorn | F24D 1/00 237/67 |
| 1,662,249 | A | 3/1928 | Jennings | |
| 2,419,669 | A * | 4/1947 | Birmann | F04D 29/444 415/208.4 |
| 2,705,973 | A * | 4/1955 | Kice | F15D 1/04 138/39 |

(Continued)

FOREIGN PATENT DOCUMENTS

| | | |
|---|---|---|
| EP | 1507977 | 2/2005 |
| FR | 1603204 | 3/1971 |

(Continued)

*Primary Examiner* — Igor Kershteyn
(74) *Attorney, Agent, or Firm* — Norton Rose Fulbright Canada

(57) ABSTRACT

A diffuser for a centrifugal compressor includes a diffuser pipe having an internal flow passage extending therethrough between an inlet and an outlet, a bend in the internal flow passage disposed between the inlet and the outlet, and a throat defined in the internal flow passage downstream of the inlet and upstream of the bend. One or more vortex generators project into the internal flow passage, and the vortex generators are disposed downstream of the throat and upstream of the bend. A method for diffusing fluid flow in a diffuser of a compressor is also described. In operation, the vortex generators engage fluid flow in the internal flow passage to generate downstream vortices.

20 Claims, 5 Drawing Sheets

(56) References Cited

U.S. PATENT DOCUMENTS

| | | | |
|---|---|---|---|
| 3,006,145 | A | 10/1961 | Sobey |
| 3,333,762 | A * | 8/1967 | Vrana .................. F04D 21/00 415/207 |
| 3,420,435 | A | 1/1969 | Jarosz et al. |
| 3,613,360 | A | 10/1971 | Howes |
| 3,652,176 | A | 3/1972 | Walsh |
| 3,706,510 | A | 12/1972 | O'Connor |
| 3,768,919 | A | 10/1973 | O'Connor |
| 3,832,089 | A | 8/1974 | Moellmann |
| 3,856,430 | A | 12/1974 | Langham |
| 3,879,939 | A * | 4/1975 | Markowski .............. F23R 3/16 60/751 |
| 3,935,034 | A | 1/1976 | Hayes |
| 3,964,837 | A | 6/1976 | Exley |
| 3,971,218 | A | 7/1976 | Toth, Jr. et al. |
| 4,054,398 | A | 10/1977 | Penny |
| 4,131,389 | A | 12/1978 | Perrone et al. |
| 4,164,845 | A | 8/1979 | Exley et al. |
| 4,212,585 | A | 7/1980 | Swarden et al. |
| 4,264,271 | A | 4/1981 | Libertini |
| 4,308,718 | A | 1/1982 | Mowill |
| 4,315,714 | A | 2/1982 | Exley et al. |
| 4,349,314 | A | 9/1982 | Erwin |
| 4,368,005 | A | 1/1983 | Exley et al. |
| 4,395,197 | A * | 7/1983 | Yoshinaga ........... F04D 29/444 415/208.3 |
| 4,402,764 | A | 9/1983 | Clark et al. |
| 4,445,816 | A | 5/1984 | Ribaud et al. |
| 4,576,550 | A | 3/1986 | Bryans |
| 4,687,412 | A | 8/1987 | Chamberlain |
| 4,740,138 | A | 4/1988 | Zaehring et al. |
| 4,832,993 | A | 5/1989 | Coulon |
| 4,919,773 | A | 4/1990 | Naik |
| 4,989,807 | A | 2/1991 | Foreman et al. |
| 5,064,691 | A | 11/1991 | Kirner et al. |
| 5,228,832 | A * | 7/1993 | Nishida ................ F04D 17/06 415/208.1 |
| 5,252,027 | A | 10/1993 | Brasz |
| 5,327,940 | A | 7/1994 | Presz, Jr. |
| 5,372,477 | A | 12/1994 | Cole |
| 5,427,498 | A | 6/1995 | Lehe et al. |
| 5,461,860 | A | 10/1995 | Schegk |
| 5,478,200 | A | 12/1995 | Broderson et al. |
| 5,529,084 | A * | 6/1996 | Mutsakis ............... F15D 1/04 137/13 |
| 5,564,898 | A | 10/1996 | Richards et al. |
| 5,601,406 | A | 2/1997 | Chan et al. |
| 5,618,162 | A | 4/1997 | Chan et al. |
| 5,876,572 | A | 3/1999 | Rickerby et al. |
| 5,992,465 | A * | 11/1999 | Jansen .................. F16L 55/00 138/37 |
| 6,155,777 | A | 12/2000 | Aschenbruck et al. |
| 6,166,462 | A | 12/2000 | Finkenbinder et al. |
| 6,209,312 | B1 | 4/2001 | Singer et al. |
| 6,210,104 | B1 | 4/2001 | Schonenborn |
| 6,220,816 | B1 | 4/2001 | Nguyen Duc et al. |
| 6,224,321 | B1 | 5/2001 | Ebden et al. |
| 6,279,322 | B1 | 8/2001 | Moussa |
| 6,471,475 | B1 | 10/2002 | Sasu et al. |
| 6,478,887 | B1 | 11/2002 | Sue et al. |
| 6,520,738 | B2 * | 2/2003 | Sheoran ............... B64D 33/02 415/205 |
| 6,589,015 | B1 | 7/2003 | Roberts et al. |
| 6,605,160 | B2 | 8/2003 | Hoskin |
| 6,695,579 | B2 | 2/2004 | Meng |
| 6,699,008 | B2 | 3/2004 | Japikse |
| 6,706,319 | B2 | 3/2004 | Seth et al. |
| 6,729,843 | B1 | 5/2004 | Nichtawitz et al. |
| 6,797,335 | B1 | 9/2004 | Paderov et al. |
| 7,032,383 | B2 | 4/2006 | Weber |
| 7,326,027 | B1 | 2/2008 | Skoch et al. |
| 7,553,122 | B2 | 6/2009 | Kirtley |
| 8,012,724 | B2 | 9/2011 | Holm et al. |
| 8,021,104 | B2 | 9/2011 | Gu et al. |
| 8,235,648 | B2 | 8/2012 | LeBlanc |
| 8,257,036 | B2 | 9/2012 | Norris |
| 8,287,232 | B2 | 10/2012 | Gu et al. |
| 2002/0114693 | A1 | 8/2002 | Batholoma et al. |
| 2005/0118019 | A1 | 6/2005 | Roberts et al. |
| 2012/0128475 | A1 | 5/2012 | Bailey |
| 2015/0226232 | A1 | 8/2015 | Duong |

FOREIGN PATENT DOCUMENTS

| | | |
|---|---|---|
| GB | 170815 | 10/1921 |
| JP | S569696 | 1/1981 |
| JP | 01257797 | 10/1989 |
| JP | 2011220125 | 11/2011 |
| WO | 0034628 | 6/2000 |
| WO | 0206676 | 1/2002 |
| WO | 2012060825 | 5/2012 |
| WO | 2012166858 | 12/2012 |
| WO | 2013084525 | 6/2013 |

* cited by examiner

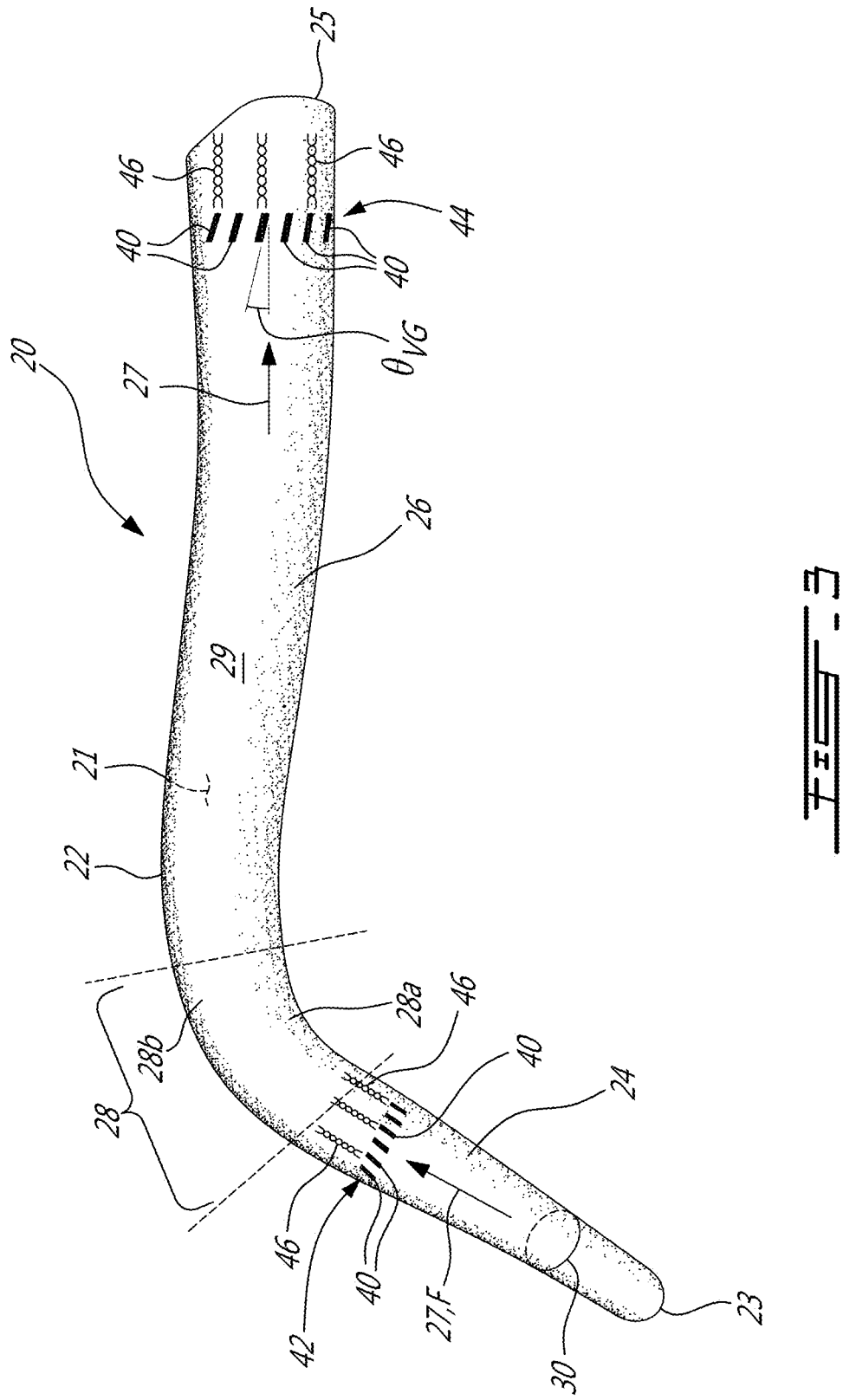

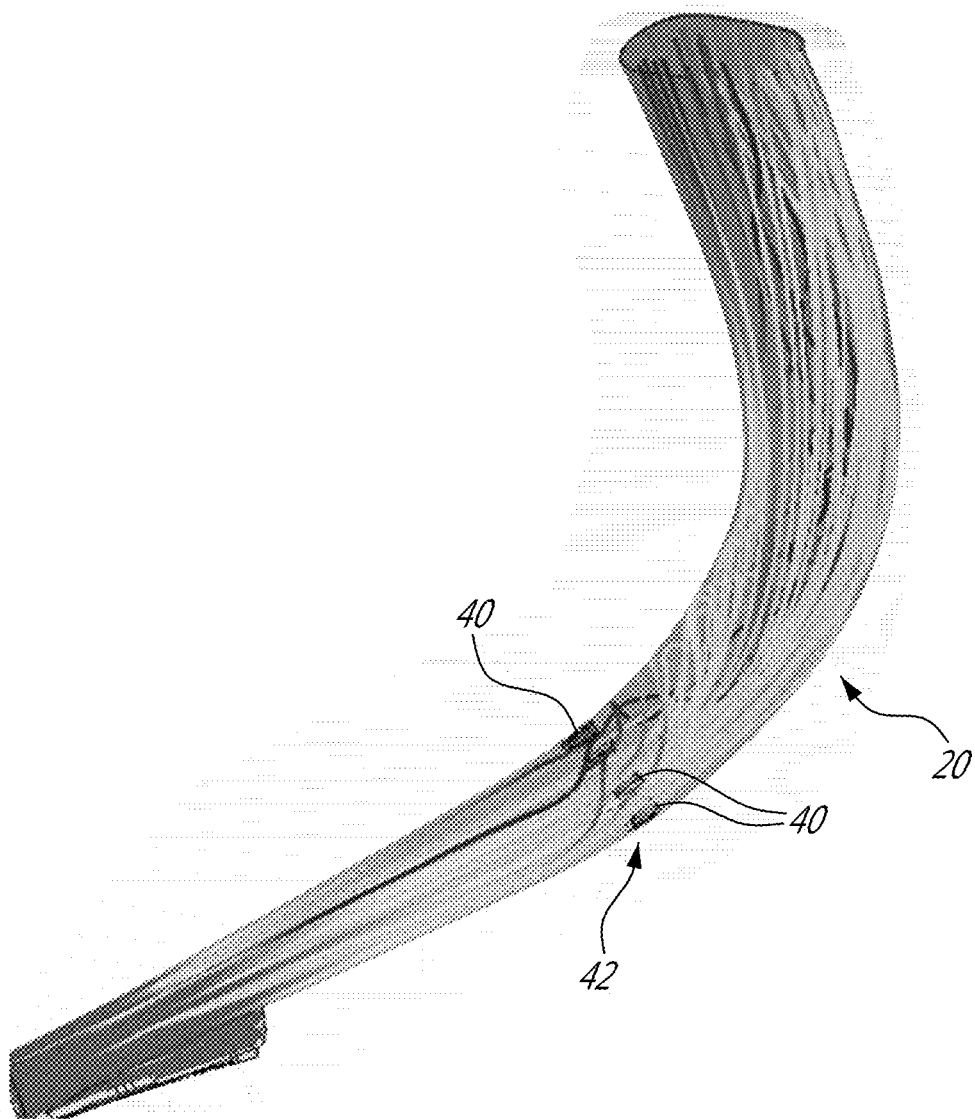

DIFFUSER PIPE WITH VORTEX GENERATORS

CROSS-REFERENCE TO RELATED APPLICATIONS

The present application is a continuation of U.S. patent application Ser. No. 14/924,108 filed Oct. 27, 2015, the entire content of which is incorporated herein by reference.

TECHNICAL FIELD

The application relates generally to gas turbine engines and, more particularly, to compressor diffusers for gas turbine engines.

BACKGROUND

Diffuser pipes are provided in certain gas turbine engines for directing flow of compressed air from an impeller of a centrifugal compressor to an annular chamber containing the combustor, while diffusing the high speed air. These diffuser pipes are typically circumferentially arranged around a periphery of the impeller, and are designed to transform kinetic energy of the flow into pressure energy. Diffuser pipes may provide a uniform exit flow with minimal distortion, because this is preferable for flame stability, low combustor loss, reduced hot spots etc.

While longer diffuser pipes may accomplish better flow diffusion, spatial constraints of the gas turbine engine may restrict the possible practical length of such diffuser pipes. Large flow diffusion in diffuser pipes over insufficient pipe length may result in thick and weak boundary layer buildup on the wall of the diffuser pipe. To compensate for a shorter length, many diffuser pipes have a tight bend formed along their length. Turbulence and other non-streamline behavior of the flow at the bend may however lead to pressure losses and decreased efficiency of the diffuser pipe, and therefore of the compressor.

SUMMARY

In accordance with one aspect, there is therefore provided a diffuser for a centrifugal compressor, the diffuser comprising: a diffuser pipe having an internal flow passage extending therethrough between an inlet and an outlet, a bend in the internal flow passage disposed between the inlet and the outlet, and a throat defined in the internal flow passage downstream of the inlet and upstream of the bend; and one or more vortex generators projecting into the internal flow passage, the vortex generators being disposed downstream of the throat and upstream of the bend.

In accordance with another aspect, there is also provided a method for diffusing fluid flow in a diffuser of a compressor, the diffuser having an internal flow passage defining a throat and a curved portion, the method comprising generating vortices in the fluid flow within the internal flow passage downstream of the throat and upstream of the curved portion.

There is further provided a compressor diffuser for a gas turbine engine comprising: at least one diffuser pipe having a tubular body with an inner surface defining an internal flow passage extending therethrough, the tubular body including a first portion extending in a first direction and defining a throat therein, a second portion extending in a second direction different from the first direction, and a curved portion fluidly linking the first portion and the second portion; and a plurality of vortex generators extending from the inner surface of the at least one diffuser pipe into the internal flow passage thereof, the vortex generators being disposed downstream of the throat in the first portion of the at least one diffuser pipe and upstream of the curved portion thereof, the vortex generators in operation engaging fluid flow in the internal flow passage to generate downstream vortices.

There is further provided a method for diffusing fluid flow in a compressor, comprising: conveying the fluid flow through a diverging internal flow passage of a compressor diffuser, the internal flow passage including a throat and at least one curved portion; and generating vortices in the fluid flow within the internal flow passage downstream of the throat and upstream of the at least one curved portion.

There is further provided a centrifugal compressor, comprising: an impeller having an inner hub with a plurality of vanes extending therefrom, the impeller being rotatable within an outer shroud about a central longitudinal axis, the impeller having a radial impeller outlet; and a diffuser configured to diffuse gas received from the impeller outlet, the diffuser comprising: a plurality of diffuser pipes each having a tubular body with an inner surface defining an internal flow passage extending therethrough, the tubular body including a first portion extending in a first direction, a second portion extending in a second direction different from the first direction, and a curved portion fluidly linking the first portion and the second portion, the first portion of the tubular body defining a throat therein; and a plurality of vortex generators extending from the inner surface of each diffuser pipe into the internal flow passage thereof and positioned downstream of the throat, each vortex generator in operation engaging gas in the internal flow passage to generate downstream vortices.

DESCRIPTION OF THE DRAWINGS

Reference is now made to the accompanying figures in which:

FIG. 3 is a partially-sectioned perspective view of a diffuser pipe of the compressor of FIG. 2, the diffuser pipe having vortex generators according to an embodiment of the present disclosure;

FIG. 4 is a side perspective view of the diffuser pipe of FIG. 3, shown at least partially transparent for illustration purposes with shading to depict streamlines of fluid flow therethrough;

DETAILED DESCRIPTION

Figure 1:
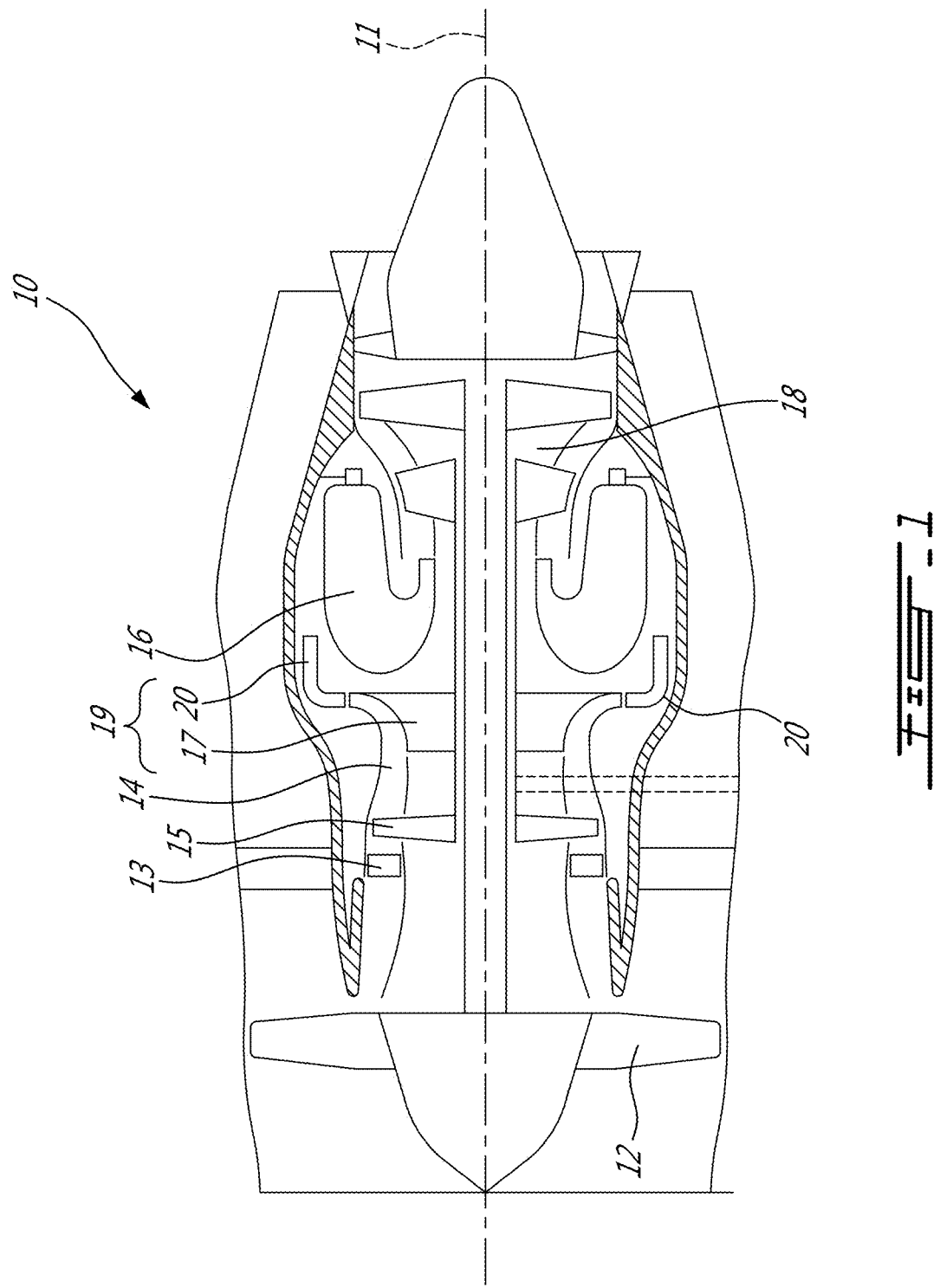
FIG. 1 is a cross-sectional view of a gas turbine engine.

FIG. 1 illustrates a gas turbine engine 10 of a type preferably provided for use in subsonic flight, generally comprising in serial flow communication along an engine axis 11: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 may include a plurality of stators 13 and rotors 15 (only one stator 13 and rotor 15 being shown in FIG. 1), and it may include a centrifugal compressor 19.

The centrifugal compressor 19 of the compressor section 14 includes an impeller 17 and a plurality of diffuser pipes 20, which are located downstream of the impeller 17 and circumferentially disposed about a periphery of the exit of the impeller 17. The diffuser pipes 20 convert high kinetic energy at the impeller 17 exit to static pressure by slowing down fluid flow exiting the impeller. The diffuser pipes 20 may also redirect the air flow from a radial orientation to an axial orientation (i.e. aligned with the engine axis 11). In most cases, the Mach number of the flow entering the diffuser pipe 20 may be at or near sonic, while the Mach number exiting the diffuser pipe 20 may be in the range of 0.2-0.25 to enable stable air/fuel mixing, and light/re-light in the combustor 16.

Figure 2:
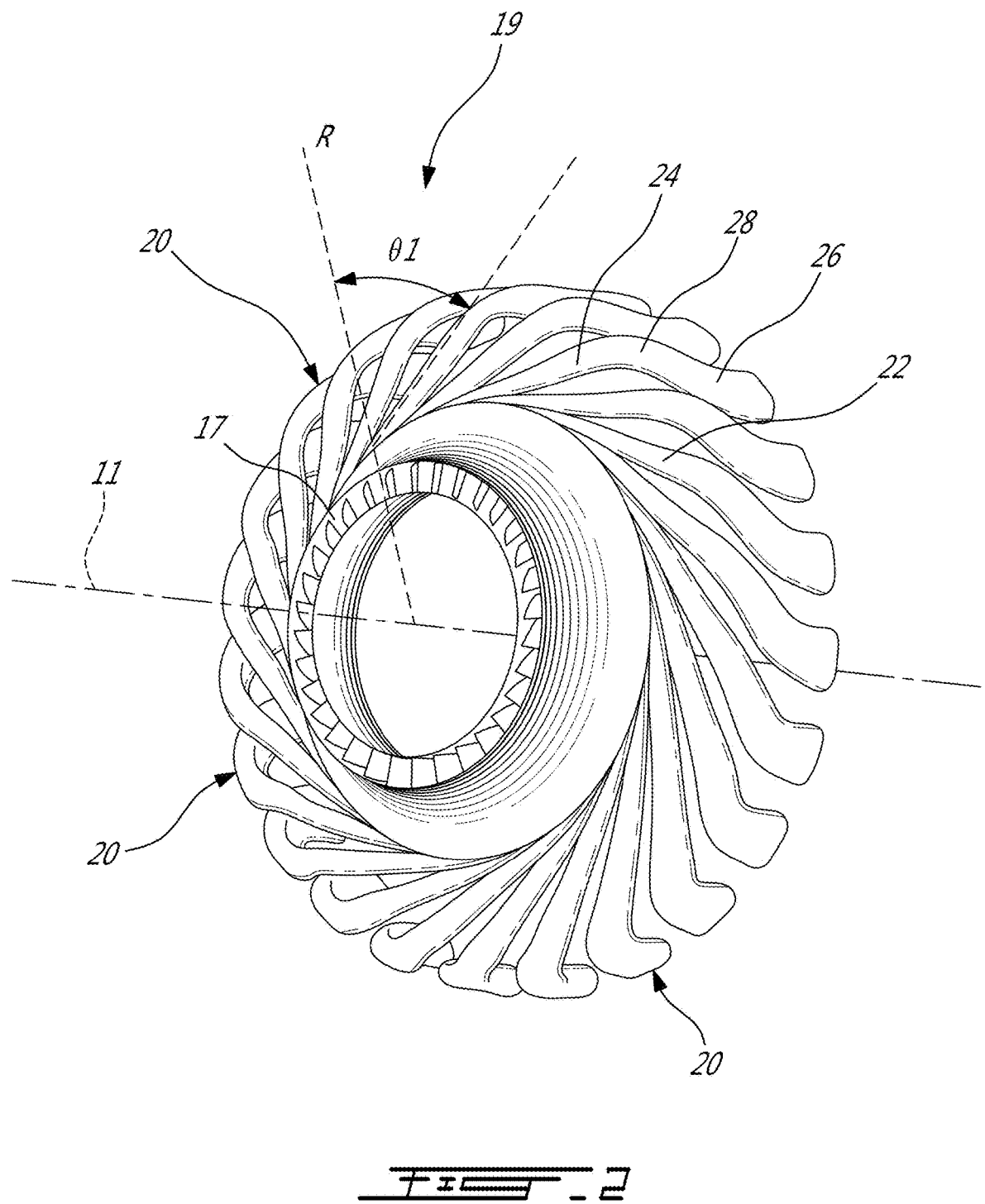
FIG. 2 is a perspective view of a centrifugal compressor for the gas turbine of FIG. 1, the centrifugal compressor including an impeller and a corresponding plurality of radially disposed diffuser pipes extending downstream of the impeller.

Turning now to FIG. 2, the centrifugal compressor 19 of the gas turbine engine 10 includes generally an impeller 17 and a plurality of diffuser pipes 20, also referred to as "fishtail diffuser pipes", which extend about the periphery of the exit of the impeller 17 and extend at least partially downstream therefrom.

Each of the diffuser pipes 20 includes a diverging (in a downstream direction) tubular body 22. This tubular body 22 of the diffuser pipes 20 may be formed, in one embodiment, of sheet metal. The enclosed tubular body 22 defines an internal flow passage 29 (seen in FIG. 3) extending the length of the diffuser pipe 20 and through which the compressed fluid flow is conveyed.

As seen in both FIGS. 2 and 3, the tubular body 22 includes a first portion 24 extending generally tangentially and radially from the periphery of the impeller 17. An open end is provided at an upstream end of the tubular body 22 and forms an inlet 23 of the diffuser pipe 20. The first portion 24 is inclined at an angle θ1 relative to a radial axis R. The angle η1 may be at least partially tangential, or even substantially tangentially, and may further correspond to a direction of the fluid flow at the exit of the blades of the impeller 17, such as to facilitate transition of the flow from the impeller 17 to the diffuser pipes 20. The first portion 24 of the tubular body 22 can alternatively extend more substantially along the radial axis R.

The tubular body 22 of the diffuser pipes 20 also includes a second portion 26, which is disposed generally axially and is connected to the first portion 24 by an out-of-plane curved portion 28 or "bend". An open end at the downstream end of the second portion 26 forms an outlet of the diffuser pipe 20. Preferably, but not necessarily, the first portion 24 and the second portion 26 of the diffuser pipes 20 are integrally formed together and extend substantially uninterrupted between each other, via the curved, bend, portion 28.

The large swirl of the flow exiting the impeller 17, and therefore entering the first portion 24 of each of the diffuser pipes 20, may be removed by shaping the diffuser pipe 20 with the curved portion 28, such that the flow is redirected axially before exiting to the combustor. For a given impeller 17 exit Mach number and swirl of the flow, the effectiveness of a diffuser pipe may be dependent upon its length. For a fishtail pipe type diffuser, such as the one described herein, the greater its length the easier it is for the pipe to diffuse flow efficiently without, or with only minimal, flow separation at the curved portion 28. Effective length can be obtained by extending the pipe radially, axially, or both. Longer diffuser pipes are however less desirable, in that they may potentially increase both the weight and the size of the engine. In addition, a required gap between the outlet of each diffuser pipe 20 and the location of the combustor fuel nozzles is another constraint that may place physical restrictions on radial/axial extension of the diffuser pipes 20. As a result, the diffuser pipe 20 may be designed to have a tight 90 degree bend in the curved portion 28 to compensate for its reduced length.

Referring now to FIG. 3, the tubular body 22 of each diffuser pipe 20 has a radially inner wall 28a and a radially outer wall 28b, which meet to form an enclosed internal fluid passage 29 extending through the length of the tubular body 22. The radially inner and outer walls 28a,28b form part of an inner surface 21 of each diffuser pipe 20. The radially inner wall 28a corresponds to the wall of the tubular body 22 that has the smallest turning radius at the curved portion 28, whereas the radially outer wall 28b corresponds to the wall of the tubular body 22 that has the largest turning radius at the curved portion 28.

As noted above, and as can be seen in FIG. 3, the tubular body 22 diverges in the direction 27 of the fluid flow F therethrough, in that the internal fluid passage 29 defined within the tubular body 22 increases in cross-sectional area along its length which extends between an inlet 23 and an outlet 25 thereof. This increase in cross-sectional area of the internal fluid passage 29 through each diffuser pipe 20 may be continuous along the complete length of the tubular body 22 or the cross-sectional area of the internal fluid passage 29 may increase in gradual increments along the tube length. In the depicted embodiment, the cross-sectional area of the inner fluid passage 29 defined within the tubular body 22 increases gradually and continuously along its length, from the inlet 23 to the outlet 25. The first portion 24 may have a generally circular cross-sectional shape, while the second portion 26 may have a flattened oval (or oblong) cross-sectional shape. Other types of cross-sections for the first portion 24 and the second portion 26 are however also within the scope of the present disclosure.

The first portion 24 is an upstream portion of each diffuser pipe 20 which receives the fluid flow F first from the exit of the impeller. The first portion 24 typically has a smaller cross-sectional area along its length than that of the curved and second portions 28,26. Each diffuser pipe 20 defines and contains therein a throat 30 located at a point between the inlet 23 and the outlet 25 of the diffuser pipe 20. More particularly, however, the throat 30 is located in the first portion 24 of the diffuser pipe 20, downstream of the inlet 23 and upstream of the curved portion or bend 28. The precise location of the throat 30 within the first portion 24 can be determined using the measured flow characteristics of the fluid flow F within the diffuser pipe 20, or can correspond to the part of the diffuser pipe 20 having the smallest cross-sectional area. In the former case, the throat 30 is referred to as the "aerodynamic throat", and in the latter case, the throat 30 is referred to as the "geometric throat". It is understood, however, that the aerodynamic throat may not necessarily occur at the same point as the geometric throat. For the geometric throat 30, each diffuser pipe 20 expands in cross-sectional area along its length from the relatively small cross-sectional area of the geometric throat 30, thereby helping to diffuse the main gas flow as it is conveyed through the diffuser pipe 20.

The location of the aerodynamic throat 30 of the diffuser pipe 20 within the first portion 24 can vary depending on numerous factors such as the flow conditions of the fluid flow F in the diffuser pipe 20, the geometry of the diffuser pipe 20, and the flow conditions upstream and/or downstream of the diffuser pipe 20. For most applications, the location of the aerodynamic throat 30 within the first portion 24 can be suitably approximated for a given range of operating conditions of the compressor using fluid dynamic analysis, and is approximately the same as the location of the geometric throat 30 within the first portion 24.

Still referring to FIG. 3, each diffuser pipe 20 has one or more vortex generators 40. Each vortex generator 40 is located within a the internal flow passage 29 of a corresponding diffuser pipe 20 and engages the fluid flow F to produce vortices 46 in the flow downstream of the vortex generator 40 in question. More particularly, the vortex generators 40 provide a swirling flow mixing action that trans downstream of the vortex generator 40. The vortex generators 40 therefore contribute to enhancing mixing between the boundary layer of the fluid flow F and the main fluid flow F, thereby helping to provide a fuller boundary layer flow. This in turn provides more resistance to flow separation, thereby contributing to improving pipe performance and flow range. As such, the vortex generators 40 can be any object or device capable of such functionality, and are referred to herein for the sake of brevity as "vortex generators 40", or simply, "VGs 40".

Each VG 40 is disposed on the inner surface 21 of the pipe and projects away therefrom into the internal flow passage 29 and therefore into the fluid flow F. In at least one embodiment, a circumferential row of VGs 40 is provided, in which the individual VGs 40 are circumferentially spaced apart from one another about the internal circumference on the inner surface 21. In some embodiments, the VGs 40 may be spaced apart along the length of the diffuser pipe 20 as well, and therefore a given set of VGs 40 may not necessarily extend circumferentially about the inner surface 21 of the pipe 20.

It has been found that the curvature of the curved portion 28 of the diffuser pipe 20 may cause the flow to detach from the internal surfaces of the inner and/or outer walls 28a,28b, which can result in pressure losses and non-uniform flow at the outlet 25 of the diffuser pipe 20. Mixing losses may also occur and negative effect overall diffuser performance. Such flow separation in the diffuser pipe 20, beginning at the curved portion 28, may not only be potentially detrimental to the performance and operability of the compressor section, but also to its structural integrity as flow separation can be destructive in nature and can lead to premature pipe breakage, fatigue, cracking, noise, flame instability etc.

In order to at least partially address these issues, the VGs 40 of the present disclosure are positioned within at least the first portion 24 of the diffuser pipe 20, and more particularly the VGs 40 are located on the inner surface 21 downstream of the throat 30 and upstream of the curved portion 28 of the diffuser pipe 20. This positions the VGs 40 downstream of the fastest moving fluid flow F, which typically occurs at, or in close proximity to, the throat 30. The VGs 40 are therefore positioned in the first portion 24 of the passage where the fluid flow F has a lower Mach number, which allows the VGs 40 to generate vortices 46 without incurring high mixing losses. The positioning of the VGs 40 upstream of the bend of the curved portion 28 also allows them to energise the boundary layer of the fluid flow F prior to flow turning at the bend, where flow separation is known to occur. Therefore, the positioning of the VGs 40 downstream of the throat 30 and upstream of the curved portion 28 allows them to energise the boundary layer to delay or reduce flow separation in the fluid flow F without incurring large mixing losses.

The presence of the VGs 40 in the diffuser pipe 20 of the present disclosure upstream of the curved portion 28 may therefore relieve the pressure gradient at the curved portion 28, and help to reduce the occurrence of flow separation downstream of the curved portion 28 of the diffuser pipe 20. This may accordingly help reduce aerodynamic pipe losses and may therefore contribute to improved overall compressor performance (e.g. stall enhancement, improved efficiency) and range.

The number, arrangement, location, and shape of the VGs 40 can vary, the various configurations all being within the scope of the present disclosure. In the embodiment of FIG. 3, some of the VGs 40 can be arranged along the inner surface 21 to form a first circumferential row 42 of VGs 40. In one possible embodiment, a second row of optional VGs 40 can be arranged downstream of the first circumferential row 42. More particularly, in this embodiment, a second circumferential row 44 of VGs 40 is positioned along the inner surface 21 of each diffuser pipe 20 within the second portion 26 of each diffuser pipe 20. The VGs 40 of the second circumferential row 44 may be positioned along a circumferential extent of the inner surface 21 corresponding to a radially outer portion of the inner surface 21. It is understood that the Mach number of the fluid flow F decreases in the direction 27 of fluid flow F, and is lowest near the outlet 25 of each diffuser pipe 20. Positioning the second set or row 44 of VGs 40 at this downstream location, just upstream of the pipe outlet 25, may therefore allow vortices 46 to be generated without incurring significant mixing losses. Three or more circumferential rows of VGs 40 are also within the scope of the present disclosure, as are alternate configurations and arrangements so VGs 40 which are not disposed in circumferential rows.

The extent of the first and second circumferential rows 42,44 can vary. In the depicted embodiment, each of the VGs 40 of the first circumferential row 42 are disposed on the inner surface 21 along the full circumference of the first portion 24 at the location of the first circumferential row 42. Alternatively, each of the VGs 40 of the first circumferential row 42 may be disposed on the inner surface 21 along only a portion of the full circumference of the first portion 24 at the location of the first circumferential row 42. For example, the VGs 40 of the first circumferential row 42 may be disposed along a circumferential extent of the inner surface 21 corresponding to the radially inner wall 28a of the inner surface 21. This partial arrangement of VGs 40 may be suitable, for example, in those diffuser pipes 20 where it is desirable to energize the boundary layer of the fluid flow F along only a portion of the diffuser pipe 20, such as its radially inner wall 28a. The VGs 40 of the second circumferential row 44 may be similarly disposed along the circumference of the inner surface 21. In one embodiment, some or all of the VGs 40 of the first circumferential row 42 are disposed along the radially inner wall 28a, and some or all of the VGs 40 of the second circumferential row 44 are disposed along the radially outer wall 28b. This arrangement of VGs 40 of the first circumferential row 42 may contribute to energizing the boundary layer of the fluid flow F along the surface of the diffuser pipe 20 where flow separation is most likely to occur. This arrangement of the VGs 40 of the second circumferential row 44 may contribute to straightening the fluid flow F prior to exiting the diffuser pipe 20 at the outlet 25.

The location of the VGs 40 of the first circumferential row 42 within the first portion 24 can be closer to the curved portion 28 than to the throat 30. More particularly, the VGs 40 of the first circumferential row 42 may be disposed in the first portion 24 at distance upstream from the curved portion 28 that is substantially equal to, or less than, one multiple of the diameter of the diffuser pipe 20 at an inlet to the curved portion 28. This positions the VGs 40 at a downstream distance from the throat 30 where the fluid flow F has already undergone some diffusion and thus has a lower Mach number. The mixing losses caused by the VGs 40 are therefore diminished at this location. This also positions the VGs 40 sufficiently close to the bend of the curved portion 28 so that they can energize the boundary layer of the fluid flow F just prior to it turning at the bend.

The shape of the VGs 40 may vary depending on the Mach number of the fluid flow F at the location of the VGs 40 within the diffuser pipe 20, among other possible factors. For example, there may be an optimal shape for the VGs 40 at each Mach number, or for a given range of Mach numbers. Each VG 40 may extend into the main fluid flow F. More particularly, each VG 40 can extend a distance from the inner surface 21 of each diffuser pipe 20 into the internal flow passage 29. The distance each VG 40 extends is the same as, or less than, a thickness of a boundary layer of the fluid flow F at the location of the VG 40 in question. Still referring to FIG. 3, one or more of the VGs 40 may be oriented with respect to the direction 27 of the fluid flow F. More particularly, each VG 40 may be oriented at an angle $\theta_{VG}$ measured with respect to the direction 27 of the fluid flow F. One possible maximum value for the angle $\theta_{VG}$ is between ±20° to ±35°. Other angles $\theta_{VG}$ are within the scope of the present disclosure, provided that the selected angle $\theta_{VG}$ helps to create energizing vortices 46 without imposing high mixing losses.

In an embodiment, one or more of the VGs 40 can extend from an outer surface of the diffuser pipe 20 to act as stiffener to help to strengthen the diffuser pipe 20. The VGs 40 may therefore be used to replace traditional stiffening ribs that are sometimes stamped on the wall of the diffuser pipes 20.

Figure 5A:
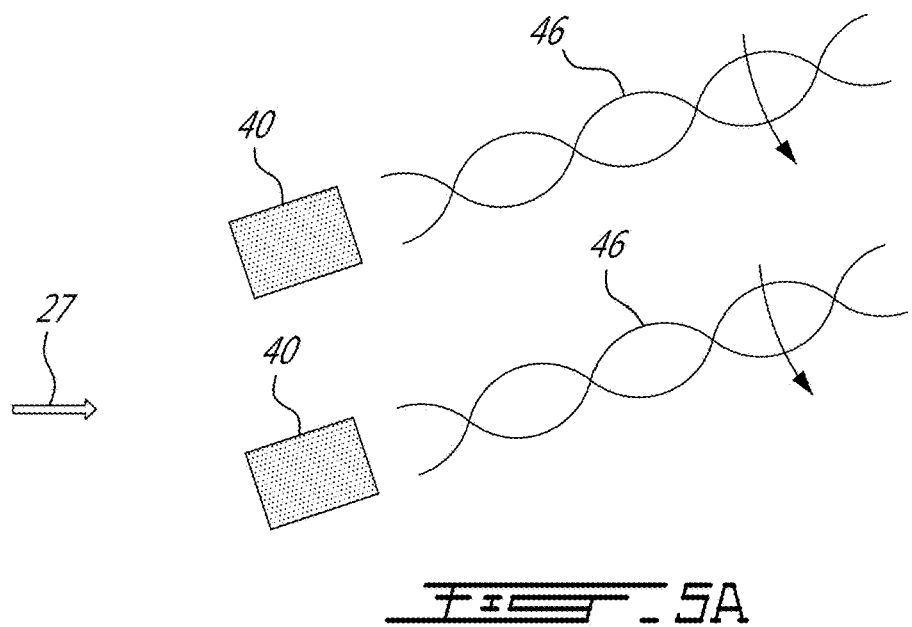
FIG. 5A is a schematic view of vortex generators generating co-rotating downstream vortices.
Figure 5B:
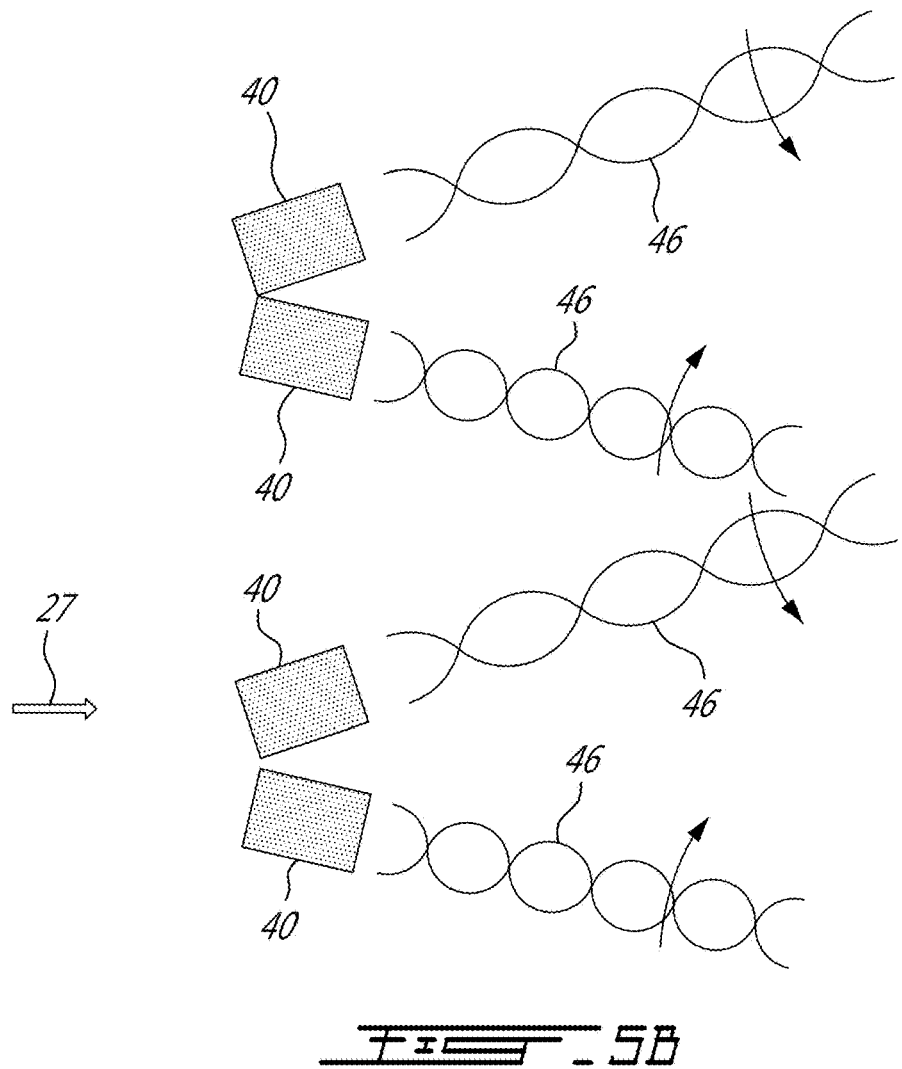
FIG. 5B is another schematic view of vortex generators generating counter-rotating vortices.

Referring to FIGS. 5A and 5B, the VGs 40 can produce co-rotating or counter-rotating downstream vortices 46. FIG. 5A shows a row of single VGs 40, which generate co-rotating vortices 46, or vortices 46 that swirl in the same rotational direction. FIG. 5B shows a row of VG 40 pairs. Each VG 40 in the pair generates a vortex 46 that swirls in a rotational direction opposite to that of the vortex 46 generated by the other VG 40 in the pair. These VGs 40 are referred to as "counter-rotating" VGs 40.

Referring to FIG. 3, there is also disclosed a method for diffusing fluid flow F. The method includes conveying the fluid flow F through a diverging internal flow passage 29 that has a throat 30 and at least one curved portion 28.

The method also includes generating vortices 46 in the fluid flow F downstream of the throat 30 and upstream of the curved portion 28, such as by using the VGs 40 disclosed herein.

The diffusion process causes diffuser pipes 20 to experience adverse pressure gradients in the direction 27 of fluid flow F, with end wall boundary layer being built up as the result. The buildup may lead to increased blockage, diminished pressure recovery and eventually leads to flow separation. The flow separation usually starts at the diffuser bend in the curved portion 28 where the curvature is at its maximum. The VGs 40 disclosed herein help the fluid flow F to resist flow separation. The VGs 40 contribute to enhancing mixing between main and boundary flow, helping to produce a fuller/stronger boundary layer. Stronger boundary layer flow is understood to be more resistant to flow separation. Velocity streamlines in FIG. 4 show the effect of the VGs 40 disclosed herein as flow separation is delayed, and less fluid flow F is recirculated back upstream. While some VG 40 designs show pressure loss due to added skin friction, this can be offset by the reduction in overall mixing loss.

A twisted diffuser pipe 20 having VGs 40 downstream of the throat 30 and upstream of the bend in the diffuser pipe 20 may thus reduce flow variation across the outlet 25 of the diffuser pipe 20. Improvement to exit flow conditions can potentially lead to noise reduction, lower vibratory stress, and reduction in pipe length/weight, as well as in overall engine length.

The above descriptions are meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A diffuser for a centrifugal compressor, the diffuser comprising:
   a diffuser pipe having an internal flow passage extending therethrough between an inlet and an outlet, a bend in the internal flow passage disposed between the inlet and the outlet, and a throat defined in the internal flow passage downstream of the inlet and upstream of the bend; and
   one or more vortex generators projecting into the internal flow passage, the vortex generators being disposed downstream of the throat and upstream of the bend.

2. The diffuser of claim 1, wherein each of the one or more vortex generators extend from an inner surface of the internal flow passage a distance substantially equal to or less than a thickness of a boundary layer at a location of the one or more vortex generators, the boundary layer being formed in operation by fluid flow in the internal flow passage.

3. The diffuser of claim 2, wherein the one or more vortex generators are disposed on a radially-inner portion of an inner surface of the internal flow passage.

4. The diffuser of claim 1, wherein the one or more vortex generators include a plurality of vortex generates forming a first circumferential row along an inner surface of the internal flow passage.

5. The diffuser of claim 4, wherein the plurality of vortex generators of the first circumferential row are spaced apart circumferentially along a full circumference of the inner surface at the first circumferential row.

6. The diffuser of claim 5, wherein the plurality of vortex generators of the first circumferential row are equally circumferentially spaced apart.

7. The diffuser of claim 4, wherein the plurality of vortex generators of the first circumferential row are spaced apart circumferentially along a portion of a full circumference of the inner surface at the first circumferential row.

8. The diffuser of claim 7, wherein the plurality of vortex generators of the first circumferential row are disposed on a radially-inner portion of the inner surface.

9. The diffuser of claim 4, wherein the plurality of vortex generators of the first circumferential row are disposed in the diffuser pipe upstream of the bend a distance substantially equal to or less than one diameter of the diffuser pipe at an inlet to the bend.

10. The diffuser of claim 4, further comprising a second circumferential row of the plurality of vortex generators, the plurality of vortex generators in the second circumferential row being circumferentially spaced-apart along the inner surface of the diffuser pipe downstream of the bend and upstream of the outlet.

11. The diffuser of claim 10, wherein the inner surface defines a radially inner and a radially outer wall, the vortex generators of the first circumferential row being disposed along the radially inner wall, and the vortex generators of the second circumferential row being disposed along the radially outer wall.

12. The diffuser of claim 11, wherein the one or more vortex generators are disposed in the diffuser pipe at a location upstream of the bend a distance substantially equal to or less than one diameter of the internal flow passage at an inlet to the bend.

13. The diffuser of claim 12, wherein each of the one or more vortex generators extend from an inner surface of the internal flow passage a distance substantially equal to or less than a thickness of a boundary layer at a location of the one or more vortex generators, the boundary layer being formed in operation by fluid flow in the internal flow passage.

14. The diffuser of claim 1, wherein each of the one or more vortex generators is inclined at an angle with respect to a direction of the fluid flow.

15. The diffuser of claim 14, wherein the angle is between 20°-35° relative to the direct of the fluid flow in the internal flow passage.

16. The diffuser of claim 2, wherein the one or more vortex generators are disposed in the diffuser pipe at a location upstream of the bend a distance substantially equal to or less than one diameter of the internal flow passage at an inlet to the bend.

17. A method for diffusing fluid flow in a diffuser of a compressor, the diffuser having an internal flow passage defining a throat and a curved portion, the method comprising generating vortices in the fluid flow within the internal flow passage downstream of the throat and upstream of the curved portion.

18. The method of claim 17, wherein generating vortices includes generating vortices at a plurality of circumferentially spaced-apart positions in the internal flow passage.

19. The method of claim 17, wherein generating vortices includes generating vortices at a distance upstream of the at least one curved portion, the distance being substantially equal to or less than one diameter of the internal flow passage at an inlet to the at least one curved portion.

20. The method of claim 17, wherein generating vortices includes generating vortices at a first location and at a second location within the internal flow passage, the first location being upstream of the at least one curved portion, and the second location being within the internal flow passage downstream of the at least one curved portion.

* * * * *